June 18, 1946.  A. S. THOMPSON  2,402,467

LUBRICATION CONTROL

Filed Jan. 31, 1944

INVENTOR
*Albert S. Thompson*
BY
ATTORNEY

Patented June 18, 1946

2,402,467

UNITED STATES PATENT OFFICE 2,402,467

LUBRICATION CONTROL

Albert S. Thompson, Primos, Pa., assignor to Westinghouse Electric Corporation, East Pittsburgh, Pa., a corporation of Pennsylvania Application January 31, 1944, Serial No. 520,488

11 Claims. (Cl. 184—6)

This invention relates to gas turbines and particularly to an improved lubricating and scavenging system therefor, and it has for an object to provide an improved system of the character set forth.

In connection with lubrication of the bearings of a gas turbine, leakage of lubricating oil during shutdown and starting periods and consequent danger of fire particularly when stopping and starting makes it desirable to remove such oil as remains in the bearings and which would otherwise leak therefrom during a shut-down period.

In accordance with the present invention, the lubricating oil is scavenged from the bearings, and preferably from the oil cooler and pipes connecting the cooler to the bearings, when the plant is shut down to prevent the accumulation of oil in the flow passage of the power plant and which might result in a serious fire hazard. Accordingly, a further object of the invention is to provide apparatus effective for this purpose.

These and other objects are effected by the invention as will be apparent from the following description and claims taken in connection with the accompanying drawing, forming a part of this application, in which:

Figure 1:
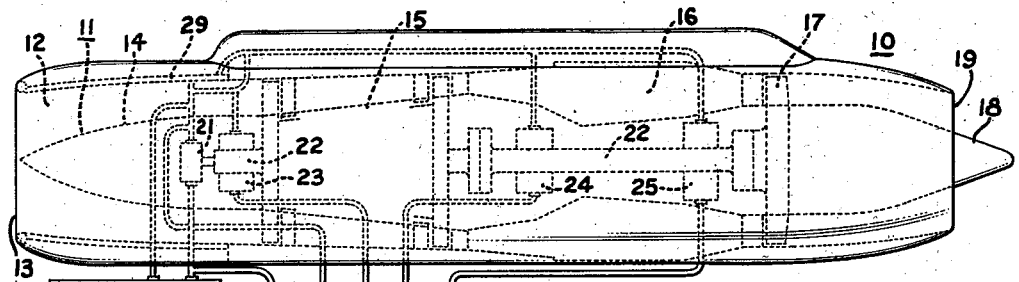
Fig. 1 is a side elevational view of a gas turbine power plant in which the present invention is incorporated.

The gas turbine power plant shown in Fig. 1 is particularly adapted for use in propelling aircraft although it is to be understood that the invention is not limited to this particular use. The plant shown in Fig. 1 is preferably constructed in accordance with the disclosure in the copending application of Stewart Way, Serial No. 482,533, filed April 10, 1943 and assigned to the assignee of the present invention. The power plant in general comprises an outer tubular casing 10 of streamline section and an axial core structure, generally indicated 11, defining, with the tubular casing, an annular flow passage 12. The flow passage 12 extends fore and aft with respect to the aircraft in which the plant is mounted with the left or inlet end 13 of the passage, as viewed in Fig. 1, pointed in the direction of flight.

The core structure 11 comprises a front fairing cone 14 adapted to house fuel and lubricating pumps and other auxiliaries (not shown), an axial flow compressor 15, a combustion chamber 16, a gas turbine 17 and an axially movable tailpiece 18 which defines with the rear of the casing 10 an adjustable annular propulsion nozzle 19.

The plant operates generally as follows: Air enters at the inlet 13, is compressed by the compressor 15 and flows into the combustion chamber 16 where it is mixed with fuel and ignited. The resulting hot motive fluid comprising the products of combustion and excess air drive the turbine 17 which extracts at least sufficient power from the motive fluid to drive the compressor 15 and the mentioned pumps and auxiliaries. The motive fluid is discharged through the propulsion nozzle 19 as a reaction jet to propel the aircraft.

A lubricating oil pump 21, as well as the rotors of the compressor 15 and turbine 17, are interconnected by means of shafting 22 which is journaled in suitable bearings 23, 24 and 25 carried by the outer casing.

A reservoir 26, which may be built into the tubular casing or mounted in any convenient location on the aircraft, provides a supply of oil for the bearings. The oil is pumped from the reservoir 26 to the bearings 23, 24 and 25 by means of the turbine-driven pump 21, which is preferably of the constant displacement type, its output depending only upon the speed of rotation of the turbine.

Figure 2:
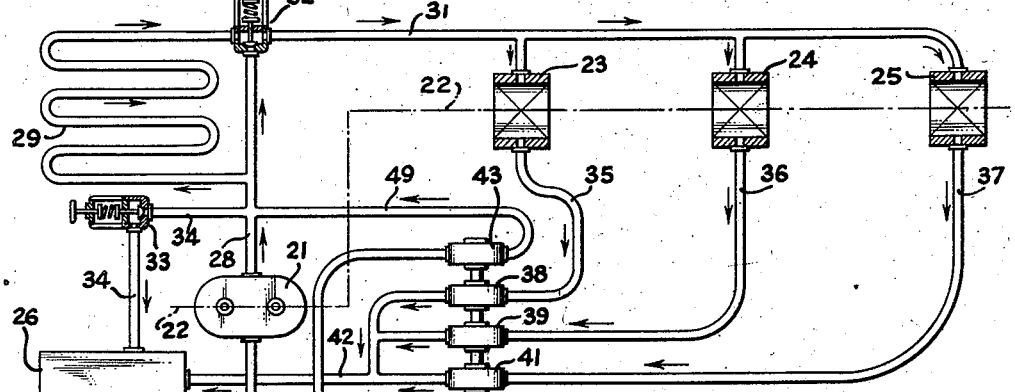
Fig. 2 is a schematic diagram of the lubricating system and oil scavenging system of the plant shown in Fig. 1.

Referring to Fig. 2, the lubrication system for bearings 23, 24 and 25 may be traced as follows: Oil from the reservoir 26 flows through a pipe 27 to the inlet of pump 21 and then through a pipe 28 connected to the outlet of the pump. The oil, now under pressure, flows through a cooler 29, which may be built into the front end of the tubular casing so that it is exposed to air flowing into the flow passage 12. The oil, on leaving the cooler 29, flows through pipe 31 to the several bearings 23, 24 and 25.

As a precautionary measure, a pressure relief valve 32 may be provided so that the oil may flow directly from the pump 21 to the pipe 31 to insure lubrication of the bearings in the event flow is sluggish through the cooler.

A second pressure relief valve 33 controls a by-pass 34 to return oil to the reservoir in the event a dangerous pressure exists in the pipe 28.

The oil leaves the bearings 23, 24 and 25 through their respective pipes 35, 36 and 37 which are connected to scavenging pumps 38, 39 and 41, respectively. The scavenging pumps return the oil to the reservoir 26 through a common pipe 42.

The scavenging pumps 38, 39 and 41 as well as a pressure pump 43 are shown as separate units in Fig. 2 but are preferably housed within a common casing 44, as shown in Fig. 1. Such pumps are driven by a motor 45. As will appear later, the motor 45 drives the pumps continuously while the power plant is in operation and also after the power plant has been shut down, for an interval sufficient to scavenge oil from the bearings 23, 24 and 25, pipe 31 and the cooler 29 to prevent oil from leaking, during standby, from the bearings to the flow passage 12, with the result that the fire hazard is minimized when stopping or starting the plant.

The pressure pump 43 draws oil from the reservoir 26 through a pipe 46, a valve 47, which is open while the plant is running, and a pipe 48, and discharges this oil through a pipe 49 into the pipe 28 leading from the outlet of pump 21. The motor 45 is started at the time the power plant is put into operation so that the pump 43 insures immediate delivery of oil to the bearings, it being borne in mind that the pump 21 is driven directly from the shaft 22 of the turbine and compressor and, therefore, is of little or no effect until the turbine reaches half speed. The supply of oil from pump 43 is aided by the simultaneous operation of the scavenging pumps 38, 39 and 41 which reduce the pressure in the bearings and their oil supply pipes.

Operation of the motor 45 is governed by a control switch mechanism, generally indicated 51, shown in the schematic diagram of Fig. 2 and located at a convenient position for the operator of the plant. In Fig. 2, the system is shown in its "off" position, that is, the power plant is idle. When the operator starts the plant in the usual manner he also depresses a spring-biased "start" button 52 of the switch mechanism 51 causing it to engage and slide a cam block 53 carried on an armature 54 of a solenoid 55 to the left, as viewed in Fig. 2, a distance sufficient to bring a contact 56 insulatedly mounted on the armature 54 into engagement with a fixed contact 57. This position of the block 53 and contact 56 is shown by dotted line 58, and it will be noted that a circuit is completed for the motor 45. The motor circuit may be traced from one side of a battery 59, conductor 61, closed contacts 56—57, conductor 62 to one side of the motor 45, from the other side of the motor through a conductor 63 to the other side of the battery. The motor now runs continuously to drive the pumps 38, 39, 41 and 43, the three former pumps scavenging the bearings and the pressure pump 43 supplying oil under pressure to the bearing supply pipe 28.

When the operator stops the power plant, he also depresses a spring-biased, stop button 64 of the switch mechanism 51 which moves the cam block 53 still farther to the left to the dotted line position 65, so that the contact 56 engages a fixed contact 66 as well as the fixed motor contact 57. Thus, the motor 45 continues to operate and a second circuit is completed for setting a timing mechanism, generally indicated 67, which permits the scavenging pumps to operate for a predetermined interval after shut-down of the power plant. This second circuit may be traced from one side of the battery, conductor 68, the winding of a solenoid 69, closed contacts 66—56 and conductor 61 to the other side of the battery.

The movable core 71 of the solenoid 69 is connected to valve stem 72 of valve 47 in the inlet pipe 46 of the pressure pump 43 so that when the solenoid is energized, upon completion of the circuit just traced, the valve 47 is closed and oil is no longer pumped to the bearings by the pump 43.

The valve stem 72 has fixed thereto an arm 73 insulatedly carrying a contact 74 connected by a flexible conductor 75 to one side of the battery 59. The contact 74 slides across a fixed contact 76 as the armature 71 is retracted by energization of the solenoid 69 to momentarily complete a circuit for a clock setting solenoid 77. This circuit may be traced from one side of the battery through conductor 75, momentarily closed contact 74—76, conductor 78, through the winding of solenoid 77, a fixed resistance 79, flexible conductor 81, closed contacts 82 and 83, and conductor 84 to the other side of the battery. This circuit is completed only momentarily since the contact 74 carried by the valve stem 72 merely slides across the contact 76 and is disengaged therefrom before engaging a fixed contact 85.

Completion of the circuit just traced energizes the winding of solenoid 77 and retracts its core 86. The core 86 is fixed to one end of a pivoted arm 87 which also carries the contact 82 and swings this arm from its full line position to its broken line position, indicated 88, separating contacts 82 and 83 to deenergize the circuit for solenoid 77. The opposite end of the arm 87 is connected to a tension spring 89 and provided with a pawl 91 which engages teeth 92 formed on a disc 93 of the clock escapement mechanism (not shown). Thus, when the solenoid 77 is momentarily energized the clock mechanism is wound to run a predetermined interval, which may be of the order of three minutes, before contacts 82 and 83 are again closed.

While the clock is running no oil is pumped to the bearings but the scavenging pumps 38, 39 and 41 continue to return oil from the bearings and cooler to the reservoir 26. However, when the clock runs down, the arm 87 is again in its full line position and the contacts 82 and 83 engage completing a circuit for the solenoid 55. This circuit may be traced from one side of the battery, conductor 75, closed contacts 74—85, conductor 94, winding of solenoid 55, conductors 95 and 81, closed contacts 82—83, and conductor 84 to the other side of the battery.

Upon energization of the solenoid 55, its core 54 is retracted and restores the cam block 53 and contact 56 to its original full line position of Fig. 2 separating contacts 56, 57 and 66. Separation of contacts 56—57 interrupts the motor circuit and stops pumps 38, 39, 41 and 43. Separation of contacts 56—66 deenergizes the solenoid 69 and permits the valve 47 to reopen ready for restarting of the gas turbine power plant.

It will be seen that the scavenging pumps 38, 39 and 41 operate for a predetermined interval after the gas turbine plant is shut down, and remove the oil from the bearings and supply pipes during which interval the flow of oil to the pressure pump 43 is interrupted by the closing of the valve 47.

Figure 3:
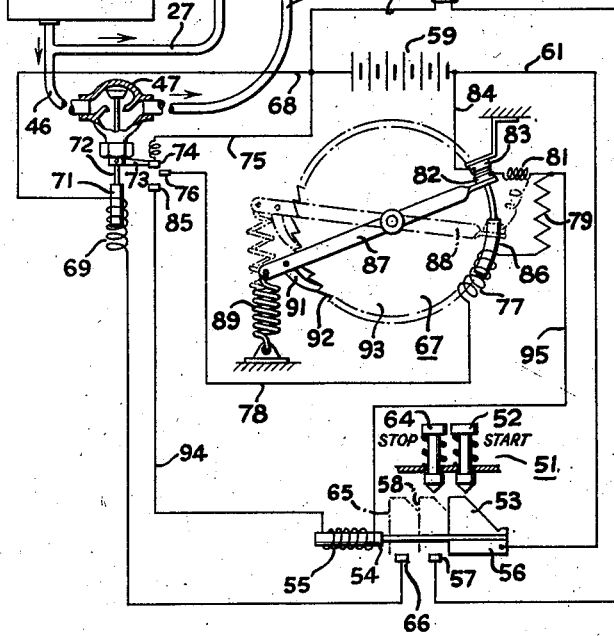
Fig. 3 is a detail view, partly in section, illustrating a modification which may be employed in the present invention.

In Fig. 3, there is shown a modification of the invention, where, instead of employing a shut-off valve 47 in the inlet pipe 46 of the pump 43 a three-way valve 96 is provided in the pump discharge pipe 49. The valve 96 is arranged to by-pass oil from the pressure side of the pump 43 to the reservoir 26 during the scavenging period following shut-down of the power plant. In this modification the operation of the solenoid 69 and contacts 74, 76 and 85 is identical with that described above, but when the solenoid 69 is energized, the valve 96 is moved from its by-pass closing position shown in full lines in Fig. 3 to its dotted line position where it closes the pipe 49 and opens the passage into a by-pass pipe 97 which returns the oil to the reservoir 26. Thus during the scavenging period the pump 43 is pumping oil, but this oil is immediately returned to the reservoir.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a gas turbine provided with one or more bearings, a pump driven by the turbine for supplying lubricating oil to the bearings, suction means for draining oil from the bearings, and means for operating the suction means a desired time interval after shutting down the turbine.

2. The combination as claimed in claim 1 with an auxiliary pump to prime the bearings with oil.

3. A gas turbine power plant or the like having one or more bearings, means for supplying oil to said bearing including a pump driven by said turbine, means including a scavenging pump for removing oil from said bearing while the turbine is in operation, an electric motor for driving said scavenging pump, a switch controlling the energization of said motor, and timing mechanism adapted to be set when said turbine is stopped and to open said switch a predetermined time thereafter so that said motor continues to drive said scavenging pump for a predetermined time, after the supply of oil to said bearing has been shut off, to remove oil from said bearing.

4. A lubricating and scavenging system for a bearing comprising an oil reservoir, means for pumping oil from said reservoir to the bearing, means for continuously withdrawing oil from said bearing, said last-mentioned means including a scavenging pump, means for driving said pump, timing means for maintaining said scavenging pump in operation for a predetermined interval following the termination of the supply of oil to the bearing to scavenge oil from the bearing whereby leakage during an idle period is prevented.

5. An oil scavenging system for a gas turbine power plant or the like comprising a scavenging pump adapted to be connected to the lubricating oil outlet of a bearing for continuously withdrawing oil from said bearing while the plant or the like is in operation, means for driving said pump, and time control mechanism for maintaining said pump driving means in operation for a predetermined interval after said plant or the like has been shut down to scavenge lubricating oil from said bearings and thereby prevent said oil from leaking therefrom during a shut-down period.

6. A lubricating system for a gas turbine power plant or the like having one or more bearings, comprising an oil reservoir, means for supplying oil under pressure to one or more bearings, means including a pump for scavenging oil from said bearing or bearings, and time control mechanism arranged to maintain said scavenging pump in operation for a predetermined interval after the supply of oil to said bearing or bearings has been shut off to scavenge oil from said bearing or bearings.

7. A lubrication system for a bearing of a gas turbine power plant or the like, comprising an oil reservoir, means for supplying oil under pressure from said reservoir to said bearing, and means for removing the oil from the bearing, said last-mentioned means including a scavenging pump, means for driving said pump, means for stopping the supply of oil to the bearing, and means for driving said scavenging pump for a predetermined period after said supply of oil has been stopped, to scavenge oil from said bearing.

8. A lubricating system for a gas turbine power plant or the like having one or more bearings, comprising an oil reservoir, an oil pumping unit including a pressure pump for supplying oil from said reservoir to said bearing and a scavenging pump for removing oil from said bearing, means for driving said unit, valve means for controlling the flow of oil from said reservoir to said bearing, means for actuating said valve means to shut off the supply of oil to said bearing, and means controlled by the actuation of said valve means for maintaining said scavenging pump in operation for a predetermined interval to remove oil from said bearing and operable at the expiration of said interval to stop said pump driving means and return said valve means to a position for supplying oil to said bearing.

9. A lubricating system for a gas turbine power plant or the like having one or more bearings, comprising an oil reservoir, an oil pumping unit including a pressure pump and a scavenging pump, means for driving said unit, means including a valve connecting the outlet of said pressure pump to the bearing, means for connecting the reservoir to the inlet of said pressure pump, means connecting said scavenging pump to said bearing for removing oil therefrom, said valve means being movable to cut off the supply of oil to said bearing, and means actuated by the movement of said valve means to cut off the supply of oil to the bearing for maintaining said scavenging pump in operation for a predetermined interval to remove oil from said bearing and operable at the expiration of said interval to stop said pump driving means and condition said valve to supply oil to said bearing.

10. A lubricating system for a gas turbine power plant or the like having one or more bearings, comprising an oil reservoir, an oil pumping unit including a pressure pump and a scavenging pump, means for driving said unit, means including a valve connecting said reservoir to the inlet of said pressure pump, means for connecting the outlet of said pressure pump to the bearing whereby said pressure pump supplies oil under pressure to said bearing when said valve is open, means connecting said scavenging pump to said bearing for removing oil therefrom, said scavenging pump discharging into said reservoir, means for closing said valve to shut off the supply of oil to said bearing, and means actuated by the closing of said valve for maintaining said scavenging pump in operation for a predetermined interval to remove oil from said bearing and operable at the expiration of said interval to stop said pump driving means and reopen said valve.

11. A lubricating and scavenging system for a bearing or bearings of a gas turbine power plant or the like, said system comprising an oil reservoir, means including a pump adapted to be driven by said gas turbine power plant for supplying oil under pressure to said bearings for lubricating the same, means including a scavenging pump for sucking the oil from said bearings and returning the same to said reservoir, means independent of the gas turbine for driving said scavenging pump, and time control mechanism arranged to maintain said independent pump driving means in operation for a predetermined interval following shut down of said gas turbine power plant to scavenge oil from said bearing.

ALBERT S. THOMPSON.